United States Patent
Baier-Welt et al.

(10) Patent No.: US 8,504,268 B2
(45) Date of Patent: Aug. 6, 2013

(54) METHOD AND ARRANGEMENT FOR APPLYING A PARKING BRAKE OF A VEHICLE DEPENDING ON THE ROADWAY CONDITIONS

(75) Inventors: Christian Baier-Welt, Ober-Ramstadt (DE); Damiano Molfetta, Wetzikon (CH)

(73) Assignee: Continental Automotive GmbH, Hannover (DE)

( * ) Notice: Subject to any disclaimer, the term of this patent is extended or adjusted under 35 U.S.C. 154(b) by 676 days.

(21) Appl. No.: 12/667,411

(22) PCT Filed: Jul. 2, 2008

(86) PCT No.: PCT/EP2008/058485
§ 371 (c)(1),
(2), (4) Date: Apr. 9, 2010

(87) PCT Pub. No.: WO2009/004022
PCT Pub. Date: Jan. 8, 2009

(65) Prior Publication Data
US 2010/0211281 A1    Aug. 19, 2010

(30) Foreign Application Priority Data
Jul. 3, 2007 (DE) .......................... 10 2007 030 780

(51) Int. Cl.
*G06G 7/70* (2006.01)
(52) U.S. Cl.
USPC .............. 701/70; 702/42; 188/72.7; 188/158; 188/342; 92/31; 303/9.76; 303/17; 303/20; 303/22.1; 340/425.5; 340/457.3

(58) Field of Classification Search
USPC .. 701/70; 702/42; 188/72.7, 158, 342; 92/31; 303/9.76, 17, 20, 22.1; 340/425.5, 457.3
See application file for complete search history.

(56) References Cited

U.S. PATENT DOCUMENTS 3,651,457 A * 3/1972 Sprouse ..................... 340/457.3
4,361,078 A * 11/1982 Cape et al. ........................ 92/31
(Continued)

FOREIGN PATENT DOCUMENTS

DE 1983541 A1 3/2000
DE 10052502 A1 4/2002
(Continued)

OTHER PUBLICATIONS

International PCT Search Report, PCT/EP2008/058485, 2 pages.

*Primary Examiner* — James Trammell
*Assistant Examiner* — Sanjeev Malhotra
(74) *Attorney, Agent, or Firm* — King & Spalding L.L.P.

(57) ABSTRACT

In a method for applying a parking brake of a vehicle depending on the roadway conditions, at least one electromechanical braking system has a parking brake and an operational brake function. An operational brake force is produced on each wheel to slow the vehicle down to a standstill. A parking brake force is generated on at least two wheels of the vehicle. The parking brake forces have an amount that corresponds to the total of the previous parking brake forces applied to all of the wheels and subsequently the stopping of the vehicle is tesste. When the vehicle is maintained in the stop position, the amount of the parking brake force on the at least two wheels is reduced and simultaneously, the service brake forces that are reduced by a certain amount corresponding to the parking brake forces are built up at least on the other wheels.

14 Claims, 3 Drawing Sheets

U.S. PATENT DOCUMENTS

| | | | |
|---|---|---|---|
| 4,407,548 A * | 10/1983 | Graham | 303/9.76 |
| 6,246,313 B1 * | 6/2001 | Baker et al. | 340/425.5 |
| 6,749,269 B1 | 6/2004 | Niwa | 303/20 |
| 7,137,672 B2 * | 11/2006 | von Mayenburg et al. | 303/22.1 |
| 7,140,697 B2 * | 11/2006 | Koga et al. | 303/20 |
| 7,299,900 B2 | 11/2007 | Herschel et al. | 188/21 |
| 7,401,872 B2 | 7/2008 | Kinder et al. | 303/191 |
| 7,628,459 B2 | 12/2009 | Herges | 303/20 |
| 7,681,961 B2 | 3/2010 | Nonaga et al. | 303/155 |
| 2002/0045506 A1 * | 4/2002 | Scheuerer | 475/5 |
| 2002/0111752 A1 * | 8/2002 | Nakamura | 702/42 |
| 2003/0006726 A1 * | 1/2003 | Weiberle et al. | 318/370 |
| 2003/0205438 A1 * | 11/2003 | Hartsock | 188/342 |
| 2004/0040799 A1 * | 3/2004 | Schumann et al. | 188/158 |
| 2004/0113486 A1 * | 6/2004 | Koga et al. | 303/20 |
| 2006/0186731 A1 | 8/2006 | Bach | 303/89 |
| 2006/0186732 A1 * | 8/2006 | Saewe et al. | 303/89 |
| 2008/0262687 A1 * | 10/2008 | Fujita et al. | 701/70 |
| 2008/0314695 A1 * | 12/2008 | Kim | 188/72.7 |
| 2009/0256416 A1 * | 10/2009 | Bensch et al. | 303/17 |

FOREIGN PATENT DOCUMENTS

| | | |
|---|---|---|
| DE | 10063063 A1 | 6/2002 |
| DE | 10238870 A1 | 3/2004 |
| DE | 10251025 A1 | 5/2004 |
| DE | 10351026 B3 | 6/2005 |
| DE | 102005023665 A1 | 11/2006 |
| DE | 102006029667 A1 | 1/2007 |
| DE | 102005060023 A1 | 6/2007 |
| DE | 102006011546 A1 | 9/2007 |
| EP | 1026060 A2 | 8/2010 |

* cited by examiner

METHOD AND ARRANGEMENT FOR APPLYING A PARKING BRAKE OF A VEHICLE DEPENDING ON THE ROADWAY CONDITIONS

CROSS-REFERENCE TO RELATED APPLICATIONS

This application is a U.S. National Stage Application of International Application No. PCT/EP2008/058485 filed Jul. 2, 2008, which designates the United States of America, and claims priority to German Application No. 10 2007 030 780.4 filed Jul. 3, 2007, the contents of which are hereby incorporated by reference in their entirety.

TECHNICAL FIELD

The invention relates to a method and to an arrangement for applying a parking brake of a vehicle depending on the roadway conditions.

BACKGROUND

Electromechanical parking brakes are already known from the prior art which are preferably provided for braking a vehicle in the static operating state. In contrast to mechanical parking brakes, which are actuated by the driver using a hand brake lever and brake actuator connected thereto via a cable pull system and therefore bring about braking of a vehicle that is being parked, said electromechanical parking brakes can also be actuated automatically using an associated control unit, i.e. without the driver manually operating an operational control. This ensures, for example, that the electromechanical parking brake always generates a brake force that is high enough to keep the respective vehicle in the predefined parking position, in order, for example, to effectively prevent it rolling away.

In particular when parking a vehicle where specific ground or roadway conditions exist and, more precisely, for example in the case of a steep gradient and/or slippery roadway surface structure, it is necessary for secure braking or parking of the vehicle to be ensured by suitable automatic control of the electromechanical parking brake. One particular problem in this connection lies in the electromechanical parking brake taking over the braking or holding function of the electromechanical service brake.

Combined electromechanical brake systems are also known which are formed by an electromechanical service brake system with integrated parking brake function, i.e. a stationary vehicle is also braked via the electromechanical service brake and, more precisely, via its parking brake function. In contrast to braking the wheels of the rear axle in the case of a parking brake that is provided in addition to the service brake, all or selected vehicle wheels can be braked simultaneously by means of the described combined electromechanical service brake system with parking brake function. If, for example, a two-axle vehicle is on a gradient with a "µ split" and is to be securely parked there, with a combined electromechanical service brake system a braking moment can be generated on the front wheels in addition to a braking moment on the rear wheels.

A braking system is already known from DE 102 51 025 which comprises a service brake and a parking brake and in which the service brake force of the service brake applied to at least the rear wheels following activation of the parking brake is only released if the parking brake force applied to the rear wheels exceeds the generated service brake force. In such cases the parking brake force is typically only generated on the rear axle in the case of a two-axle vehicle with individual service brake units on the front and rear axles, i.e. the generated parking brake force acts solely on the rear wheels of the vehicle. A higher braking moment is required to hold the vehicle when it is parked on a gradient. To prevent the vehicle from rolling away a service brake force is simulated which only acts on the rear wheels. When the service brake force is inadequate the driver can increase the service brake force on the rear wheels generated via the service brake by actuating the brake pedal until the vehicle remains stationary. Only then is a parking brake force corresponding to the service brake force generated by the parking brake, so the service brake can finally be released at the rear wheels.

A method is also known from DE 103 51 026 in which a total parking brake force, which exceeds the total of the service brake forces applied to the wheels of a vehicle, is determined as a function of the vehicle's inclination. The brake force distribution is controlled via the braking system controller and, more precisely, the same total forces respectively are adjusted for this purpose. However, this assumes that the frictional forces between the respective wheel and the ground are high enough to be able to hold the vehicle stationary. As long as the vehicle is still being held by the service brake it is possible, in particular in the case of inhomogeneously distributed frictional conditions ("µ jump"), for the braking effect to be applied solely by the front wheels, because the rear wheels are on icy ground for example. With a brake force redistribution in accordance with the above pattern the total parking brake forces on the rear wheels, correctly determined for the vehicle inclination, would indeed be generated by means of the parking brake but are not sufficient to be able to securely hold the vehicle.

Methods for determining the maximum coefficient of friction on at least one wheel of a stationary vehicle are also known in which the vehicle is at a standstill on a gradient or incline and is equipped with a movement sensor. Stopping or movement of the wheel or of the vehicle is determined via the movement sensor. The wheel or vehicle is also fitted with an electrically controllable parking brake with which the brake force can be adjusted for the wheel to be braked. The service brake or the parking brake is continuously released in this connection until the vehicle has moved a short distance. As the brake is being released it is tested whether at least one wheel is being blocked, and a maximum coefficient of friction is determined for the blocked wheel.

SUMMARY

According to various embodiments, a vehicle situated on a gradient or incline can be sufficiently braked using an electromechanical braking system comprising at least one parking brake function and to therefore prevent the vehicle from rolling away.

According to an embodiment, a method for applying a parking brake of a vehicle depending on the roadway conditions, in which at least one electromechanical braking system having a parking brake function and a service brake function is provided for braking the wheels of the vehicle, in which a service brake force is generated on each wheel in order to brake the vehicle to a standstill, wherein a parking brake force can be generated on at least two wheels of the vehicle by the at least one electromechanical braking system, may comprise steps of—generating service brake forces in a stationary vehicle on at least two of the wheels, said forces having an amount corresponding to the total of the previous service brake forces applied to all wheels, testing a stopping of the vehicle, and—when the vehicle is maintained in the stop position, the amount of the service brake forces on the at least two wheels is reduced and, simultaneously, parking brake forces corresponding to the reduction in service brake forces are built up at least on the other wheels.

According to a further embodiment, the amounts of the simultaneously generated service brake forces and parking brake forces can be selected in such a way that their totals do not fall below at least a predefined total brake force. According to a further embodiment, the amount of the service brake forces and parking brake forces can be reduced or built up gradually or continuously. According to a further embodiment, the amount of the service brake forces applied to two axially, diagonally or laterally opposing wheels can be reduced and, simultaneously, parking brake forces corresponding to the reduction in service brake forces are built up on the other two axially, diagonally or laterally opposing wheels. According to a further embodiment, the amount of the service brake forces applied to the left and right front wheels can be reduced and, simultaneously, parking brake forces corresponding to the reduction in service brake forces are built up on the left and right rear wheels. According to a further embodiment, the amount of the service brake forces applied to the left and right rear wheels can be reduced and, simultaneously, parking brake forces corresponding to the reduction in service brake forces are built up on the left and right front wheels. According to a further embodiment, when the vehicle is not maintained in the stop position, the amount of the service brake forces applied to the at least two wheels can be reduced and, simultaneously, service brake forces corresponding to the reduction in service brake forces are built up on the other wheels and stopping of the vehicle is tested again. According to a further embodiment, the maximum coefficients of friction on the wheels can be determined when the vehicle is still not maintained in the stop position. According to a further embodiment, a service brake force specific to one wheel and/or a parking brake force specific to one wheel, which is generated to brake the associated wheel in each case, can be respectively determined as a function of the determined maximum coefficients of friction. According to a further embodiment, redistribution of the brake force from the service brake force specific to one wheel to the parking brake force specific to one wheel starts with the wheel having the lowest maximum coefficient of friction and the other wheels may follow as a function of the amount of the respectively associated maximum coefficient of friction. According to a further embodiment, the state of movement of the vehicle can be displayed to the driver and an alarm can be emitted to the driver if the vehicle is insecurely parked or is prone to roll away. According to a further embodiment, at least the parking brake function of the electromechanical braking system can be provided by an electromechanical wedge brake, by means of whose self-energizing device the vehicle is secured against rolling forwards or backwards. According to a further embodiment, the wedge brake system can be controlled as a function of the vehicle state and/or various ambient parameters, such as the gradient of the roadway, the coefficients of friction determined specific to one wheel, the loading of the vehicle, the parking location (for example duplex garages, ferries) and/or temperature. According to a further embodiment, at least the parking brake function of the electromechanical braking system can be provided by an electromechanical spindle or cam disc system, by means of whose clamping force the vehicle is secured against rolling forwards or backwards.

According to another embodiment, an arrangement for applying a parking brake of a vehicle depending on the roadway conditions, may comprise at least one electromechanical braking system comprising a parking brake function and a service brake function, having at least one control system SS, in which a service brake force is generated on each wheel in order to brake the wheels of the vehicle to a standstill, wherein a parking brake force can be generated on at least two wheels of the vehicle by the at least one electromechanical braking system, wherein when a vehicle is stationary the electromechanical braking system is arranged to generate service brake forces on at least two of the wheels, said forces having an amount corresponding to the total of the previous service brake forces applied to all wheels, Wherein the control system is arranged to test stopping of the vehicle, and wherein when the vehicle is maintained in the stop position by the control system the electromechanical braking system is controlled in such a way that the amount of the service brake forces applied to the at least two wheels is reduced and, simultaneously, parking brake forces corresponding to the reduction in service brake forces are built up at least on the other wheels.

According to a further embodiment, at least the parking brake function of the electromechanical braking system can be formed by an electromechanical wedge braking system. According to a further embodiment, at least the parking brake function of the electromechanical braking system can be formed by an electromechanical spindle and/or cam disc system.

BRIEF DESCRIPTION OF THE DRAWINGS

The invention will be described in more detail hereinafter by way of an exemplary embodiment using the figures, in which.

DETAILED DESCRIPTION

Figure 1:
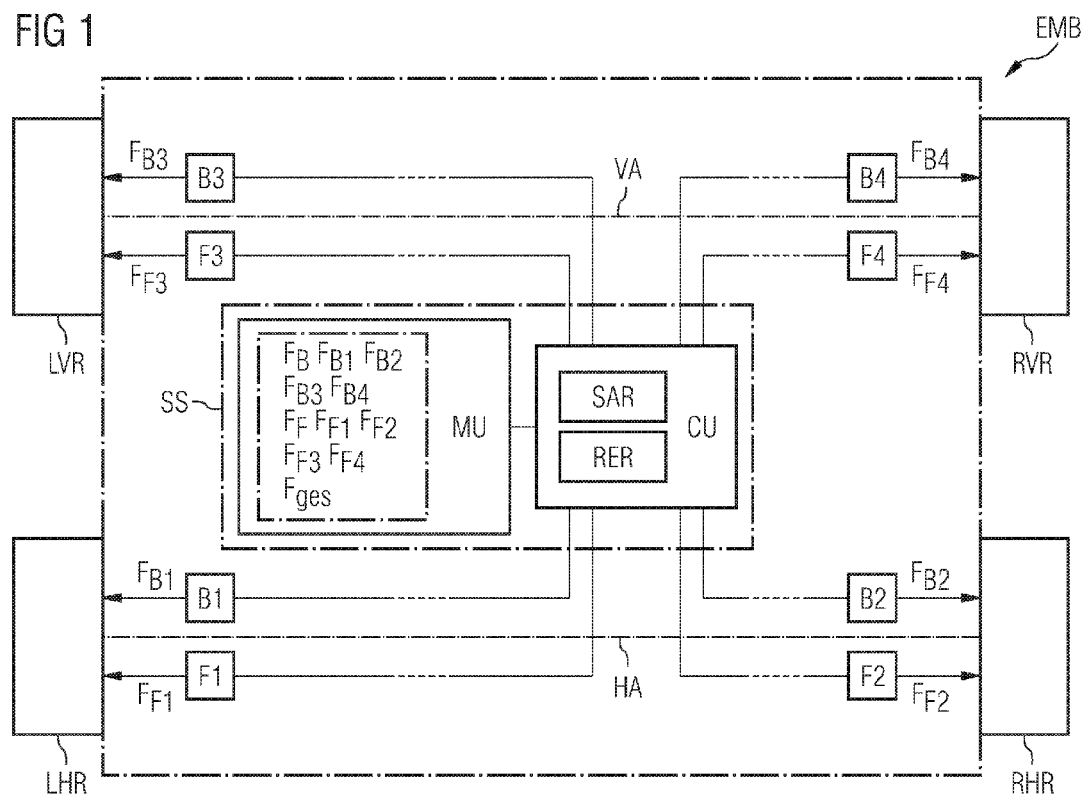
FIG. 1 shows by way of example a simplified view of a block diagram of a braking system according to various embodiments.

The fundamental aspect of the method according to various embodiments can be seen in that service brake forces in a stationary vehicle are generated on at least two of the wheels, said forces having an amount corresponding to the total of the service brake forces applied to all wheels, in that stopping of the vehicle is then tested, and in that when the vehicle is maintained in the stop position, the amount of the service brake forces applied to the at least two wheels is gradually or continuously reduced and, simultaneously, parking brake forces corresponding to the reduction in service brake forces are built up at least on the other wheels. The vehicle is particularly advantageously fitted with an electromechanical parking brake system and a service brake system which can be constructed, for example, as a "combined" electronic braking system. This has the advantage that it is possible to brake not just the wheels of the rear axle using the electromechanical parking brake, but all vehicle wheels. By means of the method according to various embodiments for applying a parking brake of a vehicle depending on roadway conditions it is possible by way of an advantageous distribution of the brake forces as a function of the existing roadway conditions to securely park a vehicle by, for example, braking the wheels which exhibit a coefficient of friction sufficient to hold the vehicle. This prevents wheels which are located on ground with a low coefficient of friction, for example black ice, from being braked.

The amounts of the simultaneously generated service brake forces and parking brake forces are also advantageously selected such that their totals do not fall below at least a predefined total brake force. This ensures that the brake forces applied to hold the vehicle on the gradient or incline are always sufficient while the brake function is being transmitted from the service brakes to the parking brakes.

According to a further embodiment, the amount of the service brake forces applied to two axially, diagonally or laterally opposing wheels is reduced and, simultaneously, parking brake forces corresponding to the reduction in service brake forces are built up on the other two axially, diagonally or laterally opposing wheels.

According to yet another embodiment, in an arrangement for applying a parking brake of a vehicle depending on the roadway conditions, when a vehicle is stopped the electromechanical braking system is arranged to generate service brake forces on at least two of the wheels, said forces having an amount corresponding to the total of the previous service brake forces applied to all wheels, and the control system is arranged to test the stop position of the vehicle. When the vehicle is maintained in the stop position by the control system the electromechanical braking system is advantageously controlled in such a way that the amount of the service brake forces applied to the at least two wheels is reduced and, simultaneously, parking brake forces corresponding to the reduction in service brake forces are built up at least on the other wheels.

FIG. 1 shows by way of example a schematic block diagram of an electromechanical braking system EMB that is integrated in a vehicle. The vehicle comprises, for example, at least four wheels and, more precisely, a left front wheel LVR, a right front wheel RVR, a left rear wheel LHR and a right rear wheel RHR. An allocation of the left and right front wheels LVR, RVR to a front axle VA and of the left and right rear wheels LHR, RHR to a rear axle HA will be referred to hereinafter, the front and rear axles VA, HA specifying the physical arrangement of the respective wheels LVR, RVR and LHR, RHR with respect to each other within the vehicle, rather than forming a rotatably fixed connection or rigid axle for the respective front wheels LVR, RVR or rear wheels LHR, RHR.

The electromechanical braking system EMB comprises, for example, an integrated control system SS which has a control unit CU and a memory unit MU connected thereto. A plurality of units or modules of the electromechanical braking system EMB which are associated with one wheel respectively is provided on the control system SS. The units or modules provide different brake functions, in particular a service brake function and a parking brake function.

The electromechanical brake system EMB can, for example, be formed in this connection by an electromechanical service brake system and an electromechanical parking brake system which each form constructional units that are arranged separately from each other.

The electromechanical service brake system comprises, for example, a first to fourth service brake B1-B4 and the electromechanical parking brake system comprises at least first and second electromechanical parking brakes F1, F2, the first and second electromechanical parking brakes F1, F2 conventionally being provided on the rear wheels LHR, RHR of the vehicle.

In a preferred embodiment the vehicle comprises a "combined" electromechanical braking system EMB in which a service brake B1-B4 and a parking brake F1-F4 are provided on both the front wheels RVR, LVR and rear wheels LHR, RHR respectively.

In the present exemplary embodiment according to FIG. 1 a first electromechanical service brake B1 and a first electromechanical parking brake F1 are associated with the left rear wheel LHR, a second electromechanical service brake B2 and a second electromechanical parking brake F2 are associated with the right rear wheel RHR, a third electromechanical service brake B3 and a third electromechanical parking brake F3 are associated with the left front wheel LVR and a fourth electromechanical service brake B4 and a fourth electromechanical parking brake F4 are associated with the right front wheel RVR and these are connected by connecting means, for example connecting cables or wireless interfaces or a bus system, to the control system SS. The different service brakes B1-B4 and parking brakes F1-F4 can be controlled by the control unit CU in a manner specific to one wheel and preferably independently of each other. The service brakes B1-B4 and parking brakes F1-F4 associated with one wheel LVR, RVR, LHR, RHR respectively form one unit respectively with a combined electromechanical brake system EMB.

The first to fourth electromechanical service brakes B1-B4 generate a first to fourth service brake force $F_{B1}$-$F_{B4}$ and the first to fourth electromechanical parking brakes F1-F4 generate a first to fourth parking brake force $F_{F1}$-$F_{F4}$. In a preferred embodiment the amounts of the first to fourth service brake forces $F_{B1}$-$F_{B4}$ and the first to fourth parking brake forces $F_{F1}$-$F_{F4}$ match and will be designated service brake force $F_B$ and parking brake force $F_F$ respectively in the following specifications.

In this connection the parking brakes F1, F2 and F3, F4 and service brakes B1, B2 and B3, B4 associated with a wheel axle VA, HA can, for example, each be controlled together, so approximately the same service brake force $F_B$ and parking brake force $F_F$ is applied to the left and right front wheels LVR, RVR and to the left and right rear wheels LHR, RHR in each case. However, the invention is in no way restricted to two-axle vehicles of this kind; instead the concept according to various embodiments may also be used for vehicles having a plurality of electromechanical braking systems and almost any number of axles.

Furthermore, instead of an axial ("front/rear axle") control, diagonal ("right front wheel+left rear wheel" or "left front wheel+right rear wheel") or lateral ("left/right") control of the first to fourth service brakes B1-B4 and/or the parking brakes F1-F4 is also possible. Axial ("front/rear axle") control on a two-axle vehicle for example will be retained hereinafter to simplify the description of the method according to various embodiments.

Figure 2:
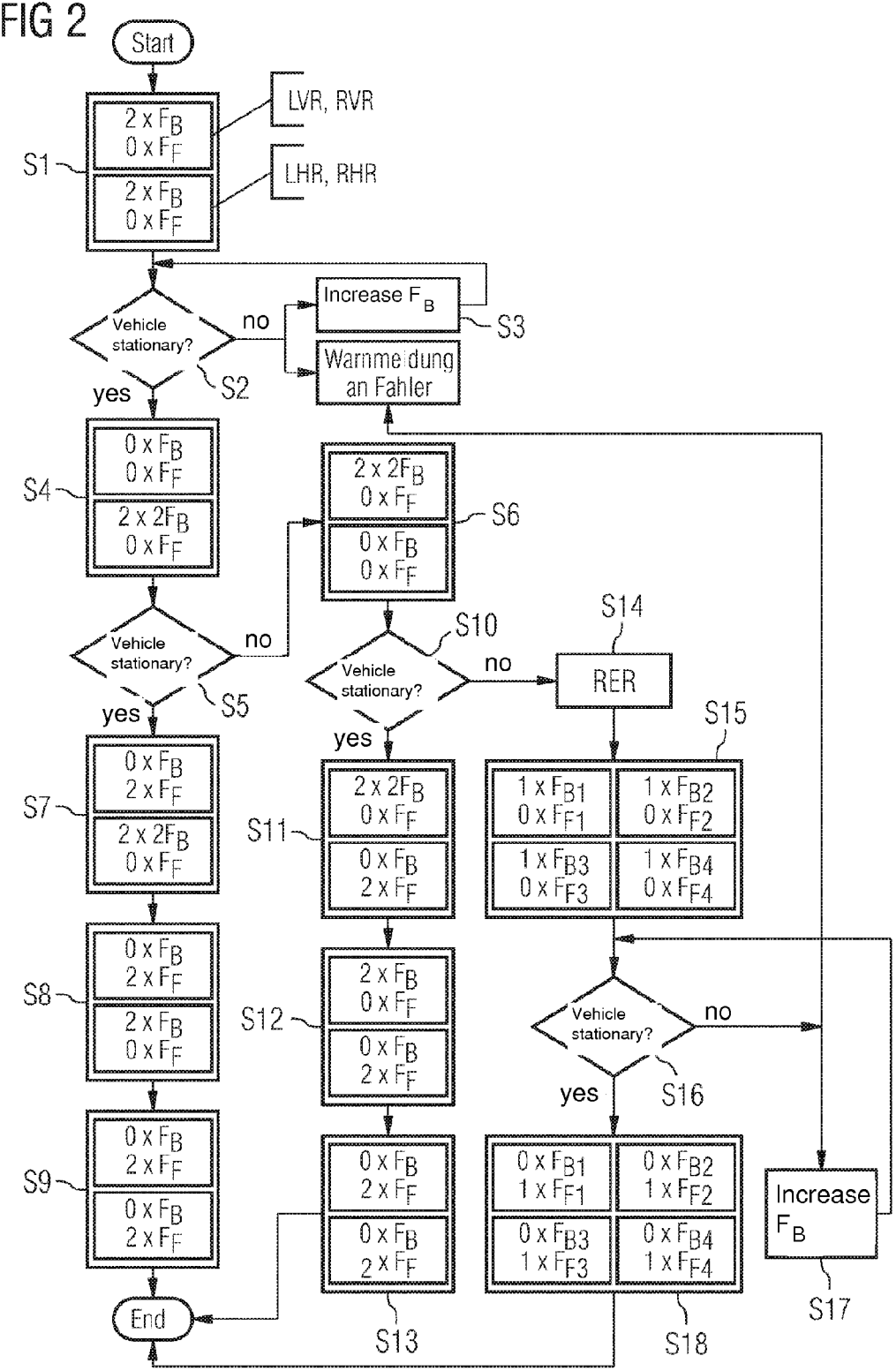
FIG. 2 shows by way of example a flow diagram of the method for applying a parking brake depending on the roadway conditions.

A control and evaluation routine SAR, whose structural design will be described by way of example in more detail hereinafter using a flow diagram shown in FIG. 2, is provided to control the electromechanical braking system EMB.

The following starting condition forms the basis of the illustrated flow diagram here: the vehicle is situated on a gradient or an incline with different frictional conditions and it firstly braked to a standstill by means of the first to fourth service brakes B1-B1. To securely park the vehicle the driver actuates the electromechanical parking brakes F1-F1 using an operational control that is provided in the vehicle. For this purpose the vehicle is firstly held by the first to fourth service brakes B1-B4 that are active on all wheels LVR, RVR, LHR, RHR. If the service brake force $F_B$ generated on each wheel LVR, RVR, LHR, RHR exceeds the maximum parking brake force $F_F$ that can be generated by the respective parking brake F1-F4 the amount of the respective service brake force $F_B$ can, for example, be reduced to the amount of the maximum parking brake force $F_F$ that can be generated by the respective parking brakes F1-F4 in each case.

According to a first step S1 of the method shown in FIG. 2 for applying a parking brake to a stationary vehicle depending on the roadway conditions, only the service brake force $F_B$ is generated on the front wheels LVR, RVR and on the rear wheels RHR, LHR at the start of the parking process, i.e. no immobilizing forces $F_F$ are applied to the front wheels LVR, RVR or rear wheels RHR, LHR. Twice the amount of the service brake force $2 \times F_B$ in each case, and no immobilizing force $0 \times F_F$, is therefore applied to the front axle VA or rear axle HA of the vehicle.

In a second step S2 it is then tested using suitable sensor units provided in the vehicle whether the vehicle is stationary. The angular momentum sensor provided in the vehicle on the front wheels LVR, RVR and/or rear wheels RHR, LHR can, for example, be evaluated by the control and evaluation routine SAR for this purpose.

If the vehicle is not stationary the respective service brake force $F_B$ is increased and if necessary an alarm can optionally be emitted to the driver by the control and evaluation routine SAR in a third step S3. The alarm informs the driver that the vehicle is currently insecurely parked and is possibly prone to roll away. The alarm can be emitted haptically, acoustically and/or visually, for example, and, more precisely, by means of a vibration unit, warning light unit or speech output unit, for example. The movement state of the vehicle is therefore indicated to the driver.

In a preferred embodiment the respective service brake force $F_B$ on the wheels LVR, RVR, RHR, LHR is gradually increased by a predefined minimum amount and the operating state of the vehicle is then tested again according to second step S2.

If the control and evaluation routine SAR establishes that the vehicle is stationary in the second step S2, the brake forces required to brake the vehicle are redistributed in a fourth step S4.

By way of example, the service brake force $F_B$ currently applied to the front wheels LVR, RVR is slowly and, more precisely, gradually or continuously, reduced and at approximately the same time the service brake force $F_B$ applied to the rear wheels LHR, RHR is correspondingly increased so following redistribution four times the amount of the service brake force $2 \times 2F_B$ is generated by the first and second service brakes B1, B2 provided on the rear wheels LHR, RHR and, more precisely, double the amount of the service brake force $2F_B$ in each case per right and left rear wheel LHR, RHR. Therefore when a vehicle is stationary, service brake forces $2 \times 2F_B$ are generated on the two rear wheels LHR, RHR having an amount corresponding to the total of the previous service brake forces $4 \times 2F_B$ applied to all wheels RVR, LVR, RHR, LHR. The total brake force $F_{ges}$ applied by the electromechanical braking system EMB to brake the vehicle therefore matches four times the amount of the service brake force $4 \times F_B$ and therefore the amount is unchanged although it is only generated by the first and second electromechanical service brakes B1, B2 arranged on the rear axle HA.

In a fifth step S5 the control and evaluation routine SAR again tests whether the vehicle is still stationary. This tests whether one of the two rear wheels LHR, RHR is situated on ground with a low coefficient of friction, for example black ice, and therefore doubling of the service brake forces on the rear wheels LHR, RHR is possibly not sufficient to continue to securely hold the vehicle stationary.

If, however, the service brake force $2F_B$ applied to the left and right rear wheels LHR, RHR is not sufficient to keep the vehicle stationary, then in a sixth step S6 the brake forces are shifted from the rear axle HA to the front axle VA. For this purpose twice the service brake force $2 \times 2F_B$ respectively for example is built up on the left and right front wheels LVR, RHR by means of the third and fourth service brakes B3, B4 and the service brake forces $F_B$ generated on the left and right rear wheels LHR, RHR are reduced.

If the test according to the fifth step S5 indicates that the vehicle is stationary, preparations are made in a seventh step S7 for redistributing the brake force from the service brakes B1-B4 to the parking brakes F1-F4 and, more precisely, twice the amount of the parking brake force $2 \times F_F$ is also generated by the third and fourth parking brakes F3, F4 on the front axle VA, in addition to four times the amount of the service brake force $2 \times 2F_B$ on the rear axle HA. At this point in time a total brake force $F_{ges}$ with four times the amount of the service brake force $4 \times 2F_B$ and twice the amount of the parking brake force $2 \times F_F$ is thus provided briefly for braking the vehicle.

In a following eighth step S8 the operating force $2 \times 2F_B$ generated on the rear axle HA is reduced and, more precisely, for example to twice the amount of the operating force $2 \times F_B$, so the single amount of the operating force $F_B$ is applied to the left and right rear wheels LHR, RHR respectively. The vehicle is therefore held by the first and second service brakes B1, B2 and by the third and fourth parking brakes F3, F4. When the vehicle is maintained in the stop position the amount of the service brakes forces $F_B$ applied to at least the rear wheels LHR, RHR is reduced and, simultaneously, parking brake forces $F_F$ corresponding to the reduction in service brake forces $F_B$ are built up at least on the front wheels RVR, LVR.

In a ninth step S9 the service brake force $F_B$ generated by the first and second service brakes B1, B2 on the rear wheels LHR, RHR is reduced and at approximately the same time a parking brake force $F_F$ is generated on the rear wheels LHR, RHR respectively by the first and second parking brakes F1, F2, i.e. the required brake force is redistributed on the rear axle HA from the service brakes B1, B2 to the parking brakes F1, F2. There is therefore a gradual redistribution of the brake force required to keep the vehicle stationary and, more precisely, of four times the amount of the respective service and parking brake forces $F_B$, $F_F$ from the first to fourth service brakes B1-B4 to the first to fourth parking brakes F1-F4. The vehicle is securely parked and the parking process complete.

In this connection the parking brake forces $F_F$ applied to the individual wheels RVR, LVR, LHR, RHR are distributed, for example, such that the total of the parking brake forces $F_F$, i.e. the total brake force $F_{ges}$, does not exceed the total of the service brake forces $F_B$.

Figure 3:
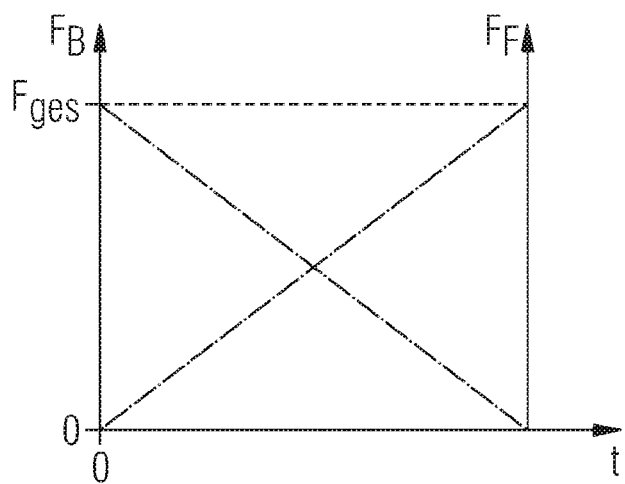
FIG. 3 shows by way of example a graph of the characteristic over time of the amounts of the service brake forces and parking brake forces during the course of transfer from the respective service brake to the parking brake.

The brake forces can be redistributed according to the graph shown in FIG. 3 by way of example. In the graph the total brake force $F_{ges}$ that results from the total of the service brake forces $F_B$ and the parking brake forces $F_F$ is plotted over time t.

The continuous redistribution of the total brake force $F_{ges}$ required to brake the vehicle to a standstill, from the first to fourth service brakes B1-B4 to the first to fourth parking brakes F1-F4, is shown by means of the dot-dash, diagonally extending lines. In particular the service brake force $F_B$ is reduced to virtually the same extent as the parking brake force $F_F$ is increased respectively, the total brake force $F_{ges}$ corresponding to four times the amount of the service brake force $F_B$ or parking brake force $F_F$.

In an advantageous embodiment the eighth and ninth steps S8, S9 can be carried out almost simultaneously, i.e. the parking brake force $F_F$ can be built up on the rear axle HA even as the service brake force $F_B$ is being reduced on the rear axle HA.

Following the sixth step S6 it is tested in a tenth step S10 whether the vehicle is stationary after redistribution of four times the amount of the service brake force $2 \times 2F_B$ to the front axle VA of the vehicle.

If redistribution results in secure parking of the vehicle, then, analogously to the seventh to ninth steps S7-S9, the brake force is approximately uniformly distributed over the front axle VA and rear axle HA, and is provided by the first to fourth parking brakes F1-F4 in each case. In an eleventh step S11 the parking brake force $F_F$ is firstly built up by the first and second parking brakes F1, F2, for example, and in a subsequent twelfth step S12 the service brake force $F_B$ generated by the third and fourth service brakes B3, B4 is reduced. At the same time, or subsequently, the parking brake force $F_F$ is built up respectively by the third and fourth parking brakes F3, F4 in a thirteenth step S13, i.e. the vehicle is now held solely by the first to fourth parking brakes F1-F4. The parking process of the vehicle is again complete.

If movement of the vehicle is detected in a tenth step S10 by appropriate sensor units, for example angular momentum sensors provided on the wheels LVR, RVR, LHR, RHR, a coefficient of friction-determining routine RER is started by the control and evaluation routine SAR in a fourteenth step S14. The coefficients of friction, in particular the maximum coefficient of friction per wheel LVR, RVR LHR, RHR, are determined by means of the coefficient of friction-determining routine RER. Different coefficient of friction-determining methods known per se from the prior art can be provided for this purpose.

The determined coefficients of friction, in particular maximum coefficients of friction per wheel LVR, RVR, LHR, RHR, are then evaluated using the evaluation and control routine SAR. The first to fourth service brake forces $F_{B1}$-$F_{B4}$, of which the amounts are possibly different, are generated by the first to fourth service brakes B1-B4 specific to one wheel and as a function of the determined maximum coefficients of friction per wheel LVR, RVR LHR, RHR to compensate the different maximum coefficients of friction.

It is then tested in a sixteenth step S16 whether the vehicle is stationary following application of the first to fourth service brake forces $F_{B1}$-$F_{B4}$.

If the service brake forces $F_{B1}$-$F_{B2}$ applied are not sufficient then, analogously to the third step S3, the respective service brake force $F_{B1}$-$F_{B4}$ is preferably gradually increased in a seventeenth step S17 and, more precisely, until the vehicle is stationary.

If the test according to the sixteenth step S16 indicates the vehicle is stationary, the brake force required to completely brake the vehicle is redistributed in an eighteenth step S18 from the service brakes B1-B4 to the parking brakes F1-F4 according to the above-described method steps. In contrast thereto however first to fourth parking brake forces $F_{F1}$-$F_{F4}$ specific to one wheel are generated, which, for example as a function of the respectively determined maximum coefficient of friction per wheel LVR, RVR LHR, RHR, can have a different amount.

The order of brake force redistribution from the first to fourth service brakes B1-B4 to the first to fourth parking brakes F1-F4 can, for example, be controlled by the control and evaluation routine SAR in such a way that redistribution is started at the wheel LVR having the lowest coefficient of friction and then the other wheels RVR, LHR, RHR follow as a function of the respectively associated coefficient of friction.

An advantageous embodiment provides that during the activation process of the first to fourth parking brakes F1-F4 the driver is informed about the instantaneous braking state, in particular the determined coefficients of friction, for example with the aid of a graphic display on a display unit in the vehicle. As a function thereof measures that are possibly required, such as choosing a new parking place, can be initiated by manual intervention on the driver's part.

The parking brake function F1-F4 of the electromechanical braking system EMB is provided by an electromechanical spindle and/or cam disc system, for example, by means of whose clamping force the vehicle is secured against rolling forwards or backwards.

A "combined" electromechanical braking system EMB can be formed for example by an electromechanical wedge brake system which comprises one electromechanical wedge brake with self-energizing device per wheel LVR, RVR LHR, RHR respectively. The wedge brake's self-energizing device, preferably formed by a wedge arrangement, is used to secure the vehicle against rolling forwards or backwards. The parking brake function in the forwards direction is assumed in this case by the self-energizing device of at least one wedge brake which comprises at least one wedge surface that is used to intensify the force during a braking operation in forward motion, whereas the parking brake function in the backwards direction is performed by a corresponding self-energizing device of at least one additional wedge brake comprising at least one further wedge face which is used to intensify the force during a braking operation in backward motion.

The coefficients of friction of the wheels LVR, RVR LHR, RHR can be determined using the control and evaluation routine SAR or the coefficient of friction-determining routine RER, and the self-energizing devices of the respectively associated wedge brakes can be controlled as a function thereof to accordingly use the mechanisms of the wedge brakes that act to prevent rolling forwards or backwards. The wedge brakes provided on the front wheels LVR, RVR could for example therefore be controlled such that they secure the vehicle against rolling backwards or "rolling downhill", while the rear wheels are located on black ice for example, in that the fourth to sixth and tenth to thirteenth steps S4-S6, S10-S13 are run through according to FIG. 2.

The wedge brakes for securing the vehicle against rolling forwards or backwards are controlled as a function of the vehicle state and/or various ambient parameters, such as the gradient of the roadway, the coefficients of friction determined specific to one wheel, the loading of the vehicle, the parking location (for example duplex garages, ferries) and/or the temperature. In this connection the respective wedge brakes are controlled such that there is still a sufficient force reserve to optionally increase the adjusted brake force in order to also be able to ensure secure parking of the vehicle in the case of changing ambient parameters.

The invention has been described above using an exemplary embodiment. It is understood that modifications and changes to the inventive subject matter are possible without departing from the inventive idea as a result.

List of reference characters

| | |
|---|---|
| B1-B4 | first to fourth electromechanical service brakes |
| CU | control unit |
| EMB | electromechanical braking system |
| F1-F4 | first to fourth electromechanical parking brakes |
| $F_B$ | service brake force |

-continued

List of reference characters

| | |
|---|---|
| $F_{B1}$-$F_{B4}$ | first to fourth service brake forces |
| $F_F$ | parking brake force |
| $F_{F1}$-$F_{F4}$ | first to fourth parking brake forces |
| $F_{ges}$ | total brake force |
| HA | rear axle |
| LHR | left rear wheel |
| LVR | left front wheel |
| MU | memory unit |
| RER | coefficient of friction-determining routine |
| RHR | right rear wheel |
| RVR | right front wheel |
| S1-S18 | method steps |
| SAR | control and evaluation routine |
| SS | control system |
| VA | front axle |

What is claimed is:

1. A method for applying a parking brake of a vehicle depending on the roadway conditions, in which at least one electromechanical braking system having a parking brake function and a service brake function is provided for braking the wheels of the vehicle, in which a service brake force is generated on each wheel in order to brake the vehicle to a standstill, wherein a parking brake force can be generated on at least two wheels of the vehicle by the at least one electromechanical braking system, that the method comprising:

applying a service brake force to each wheel of the vehicle to provide a first service force distribution among the wheels;

determining a first total service brake force comprising a total of the service brake forces applied to all of the wheels;

redistributing the service brake forces among at least two of the wheels to provide a second service force distribution among the wheels that is different from the first service force distribution, wherein the second service force distribution provides a second total service brake force that corresponds to the first total service brake force;

testing whether the vehicle is in a stop position; and when the vehicle is maintained in the stop position, redistributing the second total service brake force to parking brake forces by (a) reducing the service brake forces on the wheels and, (b) building up parking brake forces on at least one wheel, the built up parking brake forces corresponding to the reduction in the service brake forces; and wherein the amount of the service brake forces and parking brake forces are reduced or built up gradually or continuously.

2. The method according to claim 1, wherein the amounts of the simultaneously generated service brake forces and parking brake forces are selected in such a way that their totals do not fall below at least a predefined total brake force.

3. The method according to claim 1, wherein the amount of the service brake forces applied to two axially, diagonally or laterally opposing wheels is reduced and, simultaneously, parking brake forces corresponding to the reduction in service brake forces are built up on the other two axially, diagonally or laterally opposing wheels.

4. The method according to claim 3, wherein the amount of the service brake forces applied to the left and right front wheels is reduced and, simultaneously, parking brake forces corresponding to the reduction in service brake forces are built up on the left and right rear wheels.

5. The method according to claim 3, wherein the amount of the service brake forces applied to the left and right rear wheels is reduced and, simultaneously, parking brake forces corresponding to the reduction in service brake forces are built up on the left and right front wheels.

6. The method according to claim 1, wherein when the vehicle is not maintained in the stop position, the amount of the service brake forces applied to at least two wheels is reduced and, simultaneously, service brake forces corresponding to the reduction in service brake forces are built up on the other wheels and stopping of the vehicle is tested again.

7. The method according to claim 6, wherein a maximum coefficient of friction is determined for each wheel when the vehicle is still not maintained in the stop position.

8. The method according to claim 7, wherein for each wheel, at least one of a service brake force and a parking brake force specific to that wheel, is determined as a function of the maximum coefficients of friction determined for each wheel.

9. The method according to claim 8, wherein the redistribution of a brake force from a service brake force specific to one wheel to a parking brake force specific to one wheel starts with the wheel having the lowest maximum coefficient of friction of the maximum coefficients of friction determined for each wheel, and the other wheels follow in an order based on the maximum coefficients of friction determined for each respective other wheel.

10. The method according to claim 1, wherein a state of movement of the vehicle is displayed to the driver and an alarm is emitted to the driver if the vehicle is insecurely parked or is prone to roll away.

11. The method according to claim 1, wherein at least the parking brake function of the at least one electromechanical braking system comprises an electromechanical wedge brake, by means of whose self-energizing device the vehicle is secured against rolling forwards or backwards.

12. The method according to claim 11, wherein the wedge brake system is controlled as a function of at least one of a state of the vehicle and at least one ambient parameter.

13. The method according to claim 12, wherein the at least one ambient parameter are selected from the group consisting of: a roadway gradient, the one or more coefficients of friction determined specific to one wheel, a loading of the vehicle, a parking location and a temperature.

14. The method according to claim 1, wherein at least the parking brake function of the at least one electromechanical braking system comprises an electromechanical spindle or cam disc system, by means of whose clamping force the vehicle is secured against rolling forwards or backwards.

* * * * *